US007492309B2

(12) United States Patent
Hurst et al.

(10) Patent No.: US 7,492,309 B2
(45) Date of Patent: Feb. 17, 2009

(54) FREQUENCY SHIFT KEYING RADAR WITH AMBIGUITY DETECTION

(75) Inventors: David Charles Hurst, Solihull (GB); Brian Keith Taylor, Tamworth (GB); Michael Hard, Oberofflingen (DE)

(73) Assignees: TRW Limited (GB); Lucas Automotive GmbH (DE)

( * ) Notice: Subject to any disclaimer, the term of this patent is extended or adjusted under 35 U.S.C. 154(b) by 515 days.

(21) Appl. No.: 11/149,966

(22) Filed: Jun. 10, 2005

(65) Prior Publication Data

US 2006/0079749 A1    Apr. 13, 2006

Related U.S. Application Data

(63) Continuation of application No. PCT/GB03/05381, filed on Dec. 10, 2003.

(30) Foreign Application Priority Data

Dec. 10, 2002    (GB) .................. 0228731.6

(51) Int. Cl.
*G01S 13/32* (2006.01)
(52) U.S. Cl. .................. 342/70; 342/112
(58) Field of Classification Search .......... 342/70, 342/112
See application file for complete search history.

(56) References Cited

U.S. PATENT DOCUMENTS

| 4,155,088 | A | 5/1979 | Taylor, Jr. et al. ......... 343/7.7 |
| 4,495,501 | A | 1/1985 | Creed ......................... 343/7.7 |
| 5,347,283 | A | 9/1994 | Krizek et al. ................ 342/201 |
| 5,592,170 | A | 1/1997 | Price et al. ................... 342/22 |
| 5,598,165 | A | 1/1997 | Winberg et al. ............. 342/137 |
| 5,757,308 | A | 5/1998 | Lissel et al. .................. 342/70 |
| 5,768,131 | A | 6/1998 | Lissel et al. .................. 364/461 |
| 5,923,284 | A | 7/1999 | Artis et al. |
| 5,943,004 | A | 8/1999 | Groenenboom et al. ...... 342/128 |
| 5,945,939 | A | 8/1999 | Iihoshi ......................... 342/70 |
| 6,023,238 | A | 2/2000 | Cornic et al. |
| 6,396,436 | B1 | 5/2002 | Lissel et al. ................... 342/70 |
| 6,618,449 | B1 | 9/2003 | Laviec et al. |
| 2006/0079749 | A1* | 4/2006 | Hurst et al. .................. 600/407 |

FOREIGN PATENT DOCUMENTS

EP    0 703 465    3/1996

(Continued)

*Primary Examiner*—Dan Pihulic
(74) *Attorney, Agent, or Firm*—MacMillan, Sobanski & Todd, LLC

(57) ABSTRACT

A range detection apparatus comprising a transmitter adapted to transmit a microwave signal and a receiver adapted to receive an echo signal reflected from a target which corresponds to a portion of the transmitted signal; a signal generating means adapted to generate a drive signal to be applied to the transmitter to produce the transmitted signal, the signal generator producing a drive signal which includes a first signal frame comprising at least two frequencies and a second signal frame comprising at least two frequencies, the second signal frame differing from the first, and a processor adapted to process the echo signal together with the transmitted signal so as to determine the distance to the target that produced the echo signal. The apparatus may reduce ambiguity in range measurements and is particularly suited for Frequency Shift Key (FSK) radar in automotive, typically adaptive cruise control functions.

27 Claims, 6 Drawing Sheets

FOREIGN PATENT DOCUMENTS

| | | |
|---|---|---|
| EP | 0 867 731 | 9/1998 |
| EP | 0 940 689 | 9/1999 |
| EP | 1 028 323 | 8/2000 |
| GB | 2 249 448 | 5/1992 |
| WO | WO 2004053521 A1 * | 6/2004 |

* cited by examiner

FREQUENCY SHIFT KEYING RADAR WITH AMBIGUITY DETECTION

CROSS REFERENCE TO RELATED APPLICATIONS

This application is a continuation of International Application No. PCT/GB2003/005381 filed Dec. 10, 2003, the disclosures of which are incorporated herein by reference, and which claimed priority to Great Britain Patent Application No. 0228731.6 filed Dec. 10, 2002, the disclosures of which are incorporated herein by reference.

BACKGROUND OF THE INVENTION

This invention relates to apparatus for the removal of ambiguity in distance measurements in a radar system, and in particular to a continuous wave frequency shift key (FSK) radar.

Radar based distance measurement using FSK are suitable for applications requiring good range discrimination while being capable of manufacture at low cost. One such application is the use of radar of an automotive vehicle for an adaptive cruise control (ACC) related function. The radar detects the distance between a host vehicle fitted with the ACC system and a target vehicle which precedes it and the ACC maintains the vehicle at a safe distance from the obstacle by signaling the engine control or braking control systems of the vehicle.

In any radar-based system, a signal is sent out by an emitter fitted to the vehicle which is reflected from an obstacle back to a detector fitted to the vehicle. The time of flight of the reflected signal provides a measurement of distance. Measuring the Doppler shift between the transmitted signal and the reflected signal over time allows the relative velocities of the host and target vehicles to be determined.

The time of flight can be calculated by counting the number of cycles of the transmitted signal that have occurred between transmission and receipt of an echo. For the relatively high frequencies used in radar and large path lengths for vehicle guidance systems that may be up to 1 km or more, this is impractical as the number of cycles would be very high. Also, if signals are sent continuously it would not be possible to identify how many cycles have passed.

The FSK radar system provides an alternative scheme. A signal comprising a short period of at least two differing frequencies is transmitted which will generate an echo that also comprises two bursts of these differing frequencies. The relative phase of the transmitted and echo signal at each frequency is then determined. By comparing the two phase differences a distance value can be determined over a wide range of distances. The absolute number of cycles is now no longer significant. The differing frequencies are transmitted repeatedly (each group of frequencies being known as a "frame") and distance measurements are made from each frame.

In one known arrangement, a single transmitter is used to transmit a carrier signal of set frequency which is modulated to form a repeating sequence of frames. Each frame consists of a sequence of steps: each step being a continuous signal of a given frequency.

A measurement of the echo signal is made at the same point in each step, typically towards the end of each step, and compared to the phase of the transmit signal for that step. The phase measurements made for each step within a frame are then compared to determine the range.

With increasing target distance the transmit/echo signals will drift out of phase until such a point that they differ in phase by Pi radians. The two transmit/echo signals will now be in phase. As distance increases, they will again drift out of phase.

It is clearly apparent that once a target vehicle is at a distance from the radar system which is greater than or equal to the distance corresponding to a 360 degree phase shift between all the frequencies of the transmit signal and an echo signal the distance can no longer be unambiguously resolved.

Using more than two different frequencies can provide an increase in the distance over which range can be resolved unambiguously although this brings an increase in the cost and complexity of the device.

One problem of FSK radar systems is that for more distant targets the echo signal that corresponds to a single burst of frequency within a frame may be received during the period of transmission of a subsequent frequency step in that frame. This makes a phase comparison impossible, and so an error signal must be raised to indicate that the distance cannot be determined. Of more concern is the case where the echo from a burst of frequency in a frame is received during the transmission of that same frequency in a subsequent frame. Since this occurs for all steps in the frame (which will all be shifted in time by one complete frame or more) then it is impossible to tell which frame has produced an echo. Not only that, but it is not possible to tell that such an error has occurred.

One known solution to this problem is to increase the length of each frame but this reduces the rate at which distance measurements can be made. Also, it will reduce the rate at which samples can be taken for use in determining the Doppler shift since only one sample can be taken per frame. It is therefore felt that an increase in frame duration is undesirable.

An alternative solution to the problem of ambiguity is to take into consideration the amplitude of the returned signal. It is seemingly reasonable to expect the strength of an echo returned from a near target to be much greater than for a target that is much farther away. Very weak echo signals could therefore be rejected. Unfortunately this only works when the objects that are to be detected are of similar cross sectional area. A lorry at a long distance will probably send back the same amount of signal as a motorcyclist at a closer distance. Some ambiguity can therefore still be present.

BRIEF SUMMARY OF THE INVENTION

An object of the present invention is to provide an apparatus that ameliorates the distance ambiguity problem.

According to a first aspect the invention provides a range detection apparatus comprising:

a transmitter adapted to transmit a microwave signal and a receiver adapted to receive an echo signal reflected from a target which corresponds to a portion of the transmitted signal;

a signal generating means adapted to generate a drive signal to be applied to the transmitter to produce the transmitted signal, the signal generator producing a drive signal which includes a first signal frame comprising at least two frequencies and a second signal frame comprising at least two frequencies, the second signal frame differing from the first, and a processor adapted to process the echo signal together with the transmitted signal so as to determine the distance to the target that produced the echo signal.

The first and second frames may comprise a burst of a signal at a first frequency followed by a burst of a signal at a second different frequency. They may also include bursts of a third or additional frequencies. In fact, it is most preferred that each frame comprises five bursts of frequencies. By "burst" of signal we mean a short duration of time of a frequency which has a duration less than the duration of a frame. The frequency may be transmitted continuously within each burst.

The apparatus may include means for generating a carrier waveform, such as a simple sinewave, and means for modulating the carrier waveform at half the frame repetition rate to produce the drive signal that includes the first and second frames. The means for modulating the carrier waveform may comprise a waveform generator, such as a voltage controller oscillator that provides a modulating signal that is combined with the carrier waveform.

Each of the bursts of frequency within a frame may differ from the frequency that is transmitted before it and also from that which follows it within the frame. There will therefore be a stepped change in frequency between each burst in the frame. However, it is within the scope of at least one embodiment of the present invention to transmit two bursts within a frame, one after the other, which are of the same frequency.

In one especially preferred arrangement the first frame comprises first, second and third frequencies A, B and C and the second frame includes the first and second frequencies A and B but does not include the third frequency C. Instead, the third frequency C may be replaced by a fourth, different, frequency D or a repeat of either the first or second frequencies A or B.

In an alternative, instead of omitting one of the frequencies the first and second sequences may comprise identical first, second and third frequencies yet the order in which two of the frequencies are sent in the second frame may be different from that in the first whilst the order of a different pair of the three frequencies may remain the same for the first and the second frame. For example, the first frame may comprise frequencies A, B and C sent in that order and the second frame may comprise frequencies B, A and C sent in that order. This is especially useful where two pairs of frequency are sent in the first frame and the same two pairs are sent in the second but with the order of one of the pairs reversed in the second frame compared with the first frame.

Of course, in each of these examples, there may be more than three transmitted frequencies per frame. In one arrangement each frame comprises four identical frequencies A, B, C and D sent in the same order along with a fifth frequency E which is sent in the first frame at a position that corresponds to a different frequency F sent in the same position in the second frame. This burst of differing frequency in the first and second frames may be at the very end or start of the sequence for each frame.

The processor may include a phase determining means adapted to compare the relative phase between the frequency of a portion of the echo signal and the frequency of a portion of the transmitted signal at the time of receiving the echo portion. This may be performed by taking samples at least once within each burst of transmitted frequency within each frame, preferably towards the end of each burst of frequency.

There may be an error signal generation means which in the event that no meaningful phase difference can be made from a comparison of an echo sample with the transmitted signal and error flag may be raised.

The apparatus may also include means for combining at least two of the phase differences determined by the phase difference determining means as a pair to determine the distance to a target that has produced an echo signal. A pair may be formed for each burst of frequency and its neighboring or other frequency burst within a frame. For example, where three frequencies are transmitted within each frame, A, B and C, all three possible combinations of transmit signal to echo signal phase difference may be combined, i.e. A-B, B-C and C-A. Of course, not all combinations need to be made, and in practice it is sufficient to form only a single pair from a frame to get a distance measurement.

Comparison means may be provided which is adapted to compare the distance determined from a pair of echo/transmit frequency samples within the first frame with the distance determined from samples taken for the corresponding pair of frequencies within the second transmitted frame. In the event that this comparison indicates that a difference exists between the determined distance from the first frame and for the second frame for at least one of the pairs the processor may produce an output indicating that the distance of the target from the apparatus is so great that the echo signal received within a frame in fact corresponds to a signal sent from a previous frame.

Where all pairs provide the same distance estimate then the processor may be adapted to produce an output indicating that the distance of the target from the apparatus is small enough that the echo signal received within a frame in fact corresponds to a signal sent from that same frame. This allows the ambiguity that otherwise arises in the prior art FSK techniques to be overcome.

The first and second frames may also be transmitted continuously and alternately, i.e. as a repeating sequence of first frame, second frame, first frame, second frame and so on.

The processor may also be adapted to compare the average frequency of a transmitted frame with that of a frame of the echo to produce a Doppler signal over time which indicates the relative velocity of the apparatus and a target that produces an echo signal.

It is preferred that the average frequency of each of the first and second frames is the same, allowing a single Doppler signal to be produced from a sample taken from every frame. This can be ensured by, for example, simply swapping around the order of two burst of frequency in the first frame relative to the second frame.

If the average frequency of the first frame is different from the second, for example because one or more of the frequencies in the first frame differs from that in the second frame, the processor may be adapted to produce a Doppler signal using only samples taken during the first frame or during the second frame.

In a refinement, two Doppler signals may be determined, one from samples corresponding to the average frequency of the first frame and the other from samples corresponding to the second frame.

The applicant has also appreciated that it is possible to use a Doppler signal as a means of removing the ambiguity in distance that occurs when the time of flight of a return echo is greater than the duration of each frequency burst within a frame. In the event that the target is far enough away for a transmitted frequency to be received in the next frequencies transmission time there will be a shift in the apparent Doppler frequency.

If the samples used to determine the Doppler frequency are taken at points which correspond to unmodulated portions of the echo signal only a single Doppler peak will be observed. If the samples used to determine the Doppler frequency are taken at points which correspond to modulated portions of the echo signal (i.e. at the time of taking a sample the echo signal corresponds to a frequency step which is different between first and second frames), then the Doppler signal will itself be modulated at half the frame repetition rate. Since this exceeds half the sampling rate then two Doppler peaks will be produced, one at half the sample rate plus the Doppler frequency and one at half the sampling rate minus the Doppler frequency. Due to Nyquist this latter peak will be mirrored and in fact appear at the actual Doppler frequency.

The processor may include detection means which is adapted to detect the presence of a second peak in the Doppler signal, and in the event that a peak is detected provide an indication that a target that produced the echo signal is a distant target or at a close range. By close range we may mean that the time of flight of the echo signals from the object is less than one burst or step in duration, and by distant that it is greater than that duration, The processor may determine that it is a near object unless "alias" peaks are present in the Doppler signal.

The apparatus may build up a Doppler signal from samples taken during different bursts of frequency within a frame. For example, if each frame contains four frequency bursts, of frequency A, B, C and D, a Doppler signal may be constructed from samples from bursts A in each frame and another from burst B. Indeed, four samples may be taken with one corresponding to each burst. Each Doppler signal may be examined for the presence of an alias Doppler signal. If the apparatus modulates the first burst between frames then a ghost present in the samples corresponding to the second frame indicates a time of flight of greater than one burst but less than two bursts. If a ghost is present in the Doppler signal for the third burst then this indicates a time of flight of between two and three bursts and so on for each Doppler signal.

The transmitter may be driven by a signal generator circuit which is adapted to produce a signal that when combined with a carrier frequency provides each of the frequencies for the "burst" of the first and second frames to the transmitter. The signal generator may comprise a local oscillator which delivers repeated frames of different frequencies.

According to a second aspect the invention provides a method of removal of ambiguity in distance of a radar apparatus of the kind in which a carrier frequency is transmitted, the frequency being modulated such that a sequence of first and second frames are transmitted comprising:

a) Initially transmitting a first frame comprising a sequence of at least two different frequencies;

b) subsequently transmitting a second frame comprising at least two different frequencies, the second signal differing from the first signal;

c) receiving an echo signal corresponding to the transmitted signal which has been reflected from a target; and d) processing the echo signal together with the transmitted signal to determine the distance to the target.

The method may comprise transmitting the first and second frames repeatedly, preferably continuously, one after the other.

Other advantages of this invention will become apparent to those skilled in the art from the following detailed description of the preferred embodiment, when read in light of the accompanying drawings.

BRIEF DESCRIPTION OT THE DRAWINGS

DETAILED DESCRIPTION OF THE INVENTION

Figure 1A:
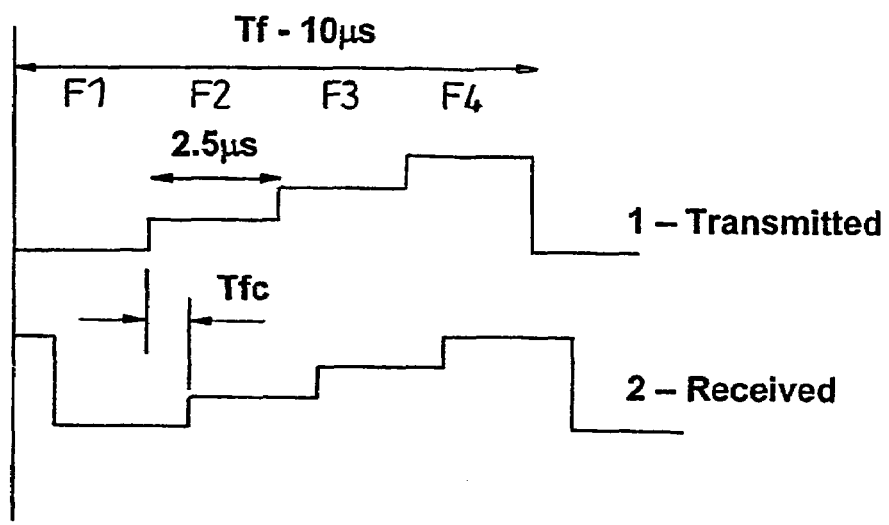
FIG. 1(a) shows the transmitted and received echo signals from a target at close range in a prior art FSK radar system.

Referring now to the drawings, there is shown in FIG. 1a the transmitted and the received waveforms for a typical FSK radar, as a function of time, where the radar is viewing a close target. In this example, the radar is transmitting four frequency sweeps, or bursts, F1 to F4, in turn, each for a 2.5 μsecond duration. This sequence, usually known as a frame, is repeated continually every 10 μseconds. If the radar is pointing at a relatively close target, the time flight of reflected echo signal portions $T_{f1}$ will be short and the frequencies of the received echo will overlap the corresponding frequencies of the transmitted signal that produced them.

Figure 1B:
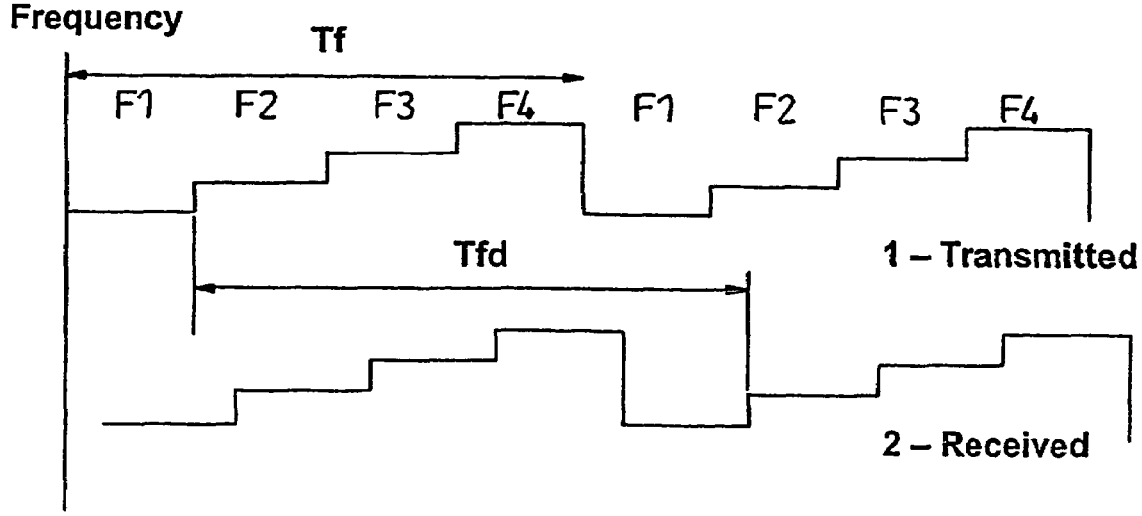
FIG. 1(b) shows the transmitted and received echo signals from a target at much greater range in a prior art FSK radar system.

For much greater distances the time of flight $T_{f2}$ of an echo will be much longer and the received echo, although received perhaps a whole frame later than for a close object, will appear to give a very similar waveform to that of a close object. The transmitted and received signals in this case are shown in FIG. 1b of the accompanying drawings.

It is well known that if two signals of different frequencies are reflected off the same target they will experience different phase shifts such that the phase difference between the received signals is equal to where c is the speed of light and F1/F2 are the two transmission frequencies. Thus the target distance D can be estimated using the relation:

$$D = c/\Delta f * \Delta \phi / 2\pi \text{ where } \Delta f = (F2-F1)$$

However, as the target distance increases it will reach a point where none of the echo signal received in a step will have been transmitted at the same frequency as the step and so the relationship is no longer valid.

Figure 2:
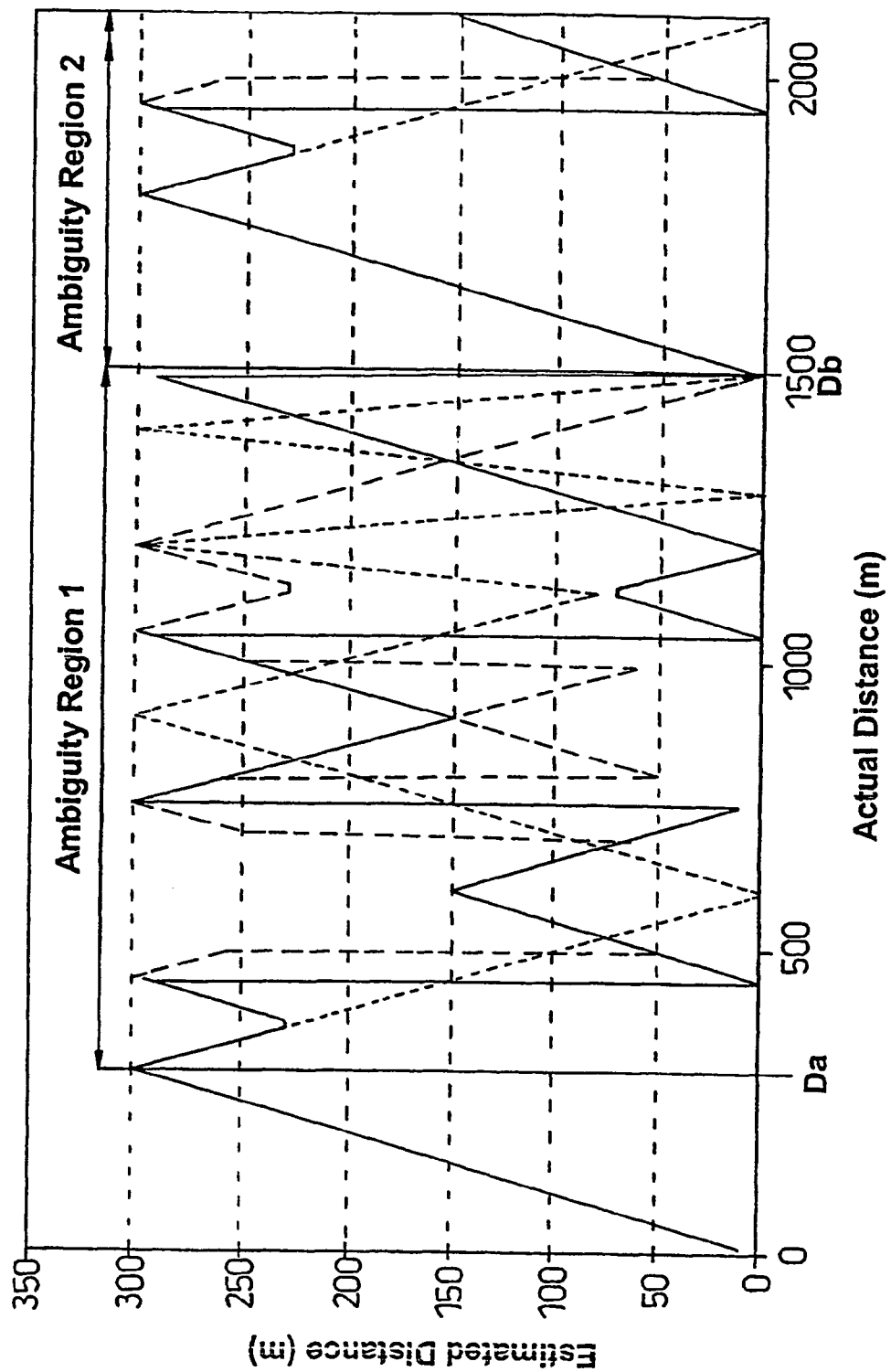
FIG. 2 illustrates how the prior art radar would report targets at increasing range.

Referring again to the drawings, FIG. 2 illustrates how the radar would report the distance to a target using such a scheme. For targets closer than distance Da, part of the echo signal in each step will have the same frequency as the step and relation (1) will hold. Above this, the transmit frequency of each step will no longer be the same and the phase difference between channels will become confused and lead to incorrect distances being reported. This is shown as ambiguity region 2.

Once the time of flight exceeds the frame period each echo measurement will start to appear the same as that received for a close object since the frequency of an echo received in a given step will be the same as that of the step, even though the echo is in fact caused by a signal transmitted a whole frame earlier. This is an ambiguous region labeled A2 in FIG. 2.

The present invention provides a way of overcoming this ambiguity.

Figure 4:
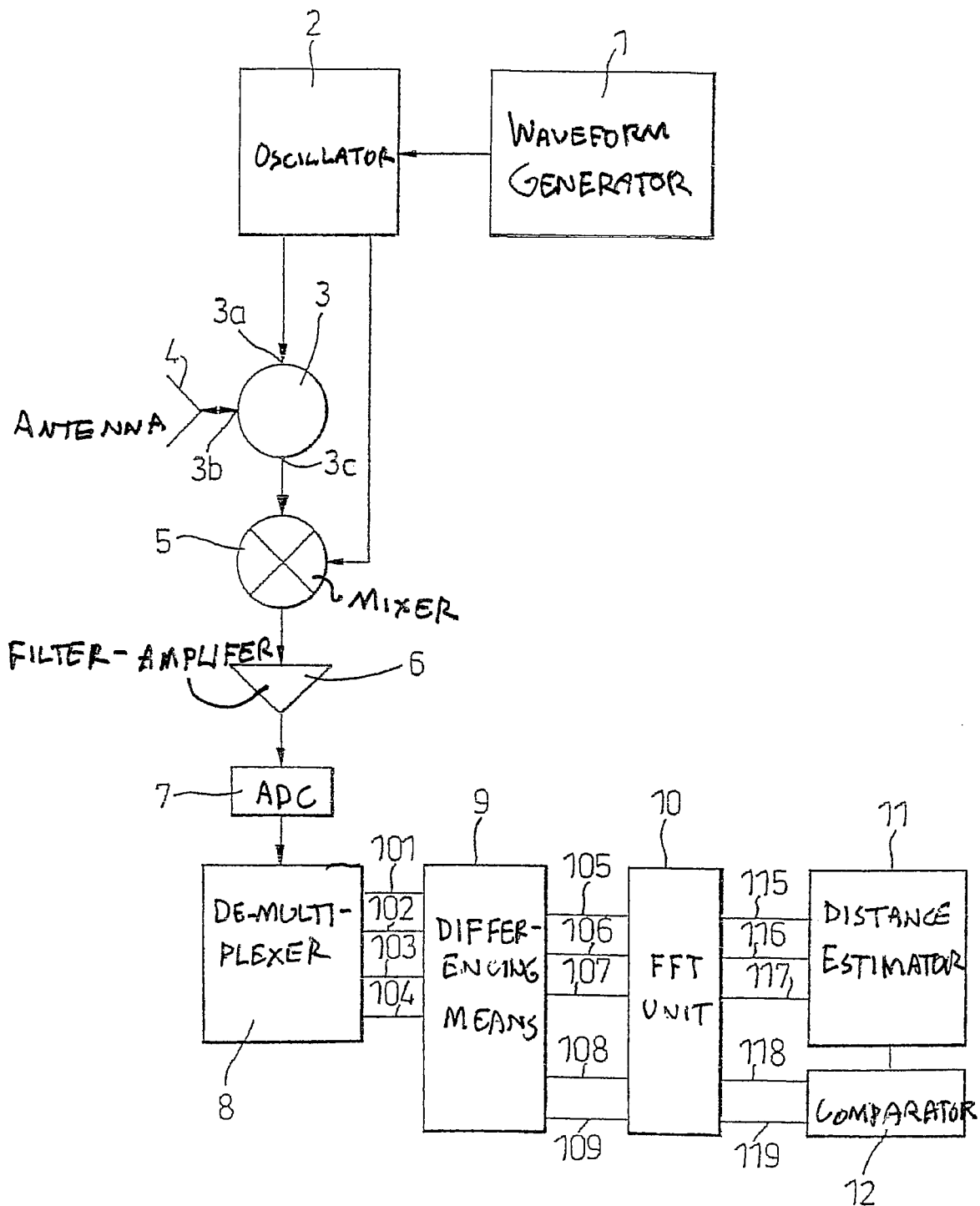
FIG. 4 is a schematic of an embodiment of a Frequency Shift Keying (FSK) radar apparatus which uses the signals shown in FIGS. 3a to 3c to remove some of the ambiguities present in the prior art system.

As shown in FIG. 4, one embodiment of an apparatus in accordance with the second aspect of the invention comprises a transmitter and a receiver which may be secured to the front of a vehicle and send out signals in a controlled beam in front of the vehicle. In a practical embodiment, a single antenna 4 may function as both the transmitter and the receiver.

The antenna 4 is driven by an output of a voltage controlled oscillator 2 which generates a series of frequencies in response to a voltage signal produced by a waveform generator 1. These series are periodic and comprise two alternating frames of four continuous steps, or bursts, of equal duration. The key feature is that the first and second frames differ either in the frequencies they contain or the order in which they are sent or both. The frames are characterized in that they are periodic at twice the frame transmission rate, but not periodic at the frame transmission rate.

Figure 3A:
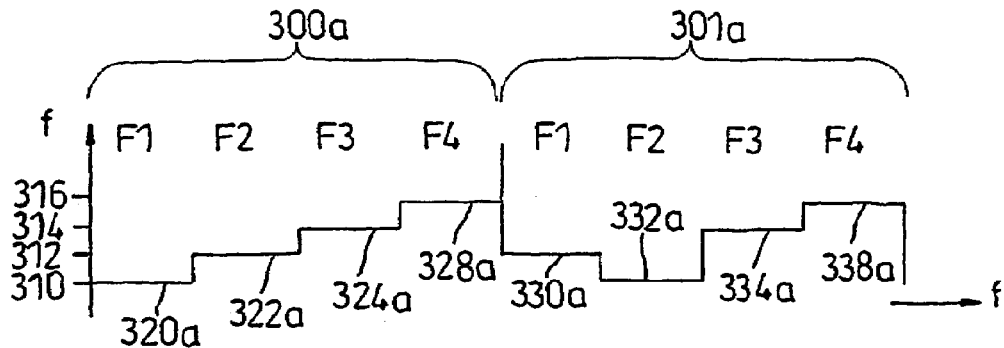
FIGS. 3a, 3b and 3c show diagrammatic representations of possible transmitted signals in an embodiment of an FSK radar apparatus according to the present invention.
Figure 3B:
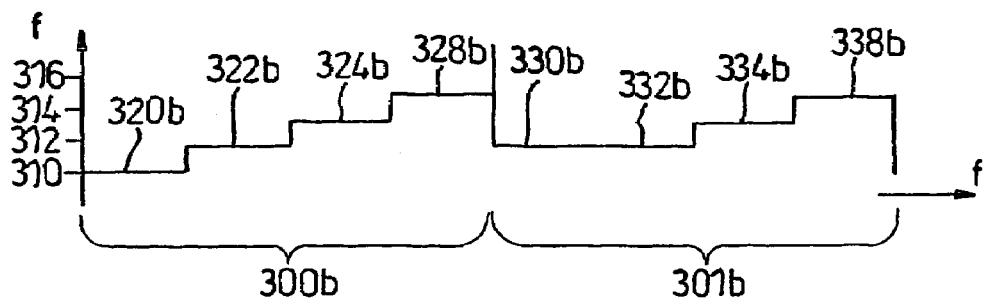
Figure 3C:
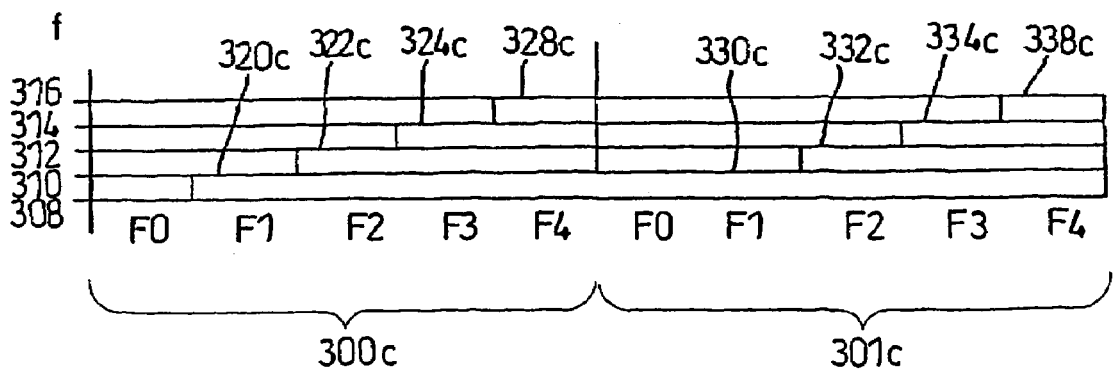

Possible frequency-time plots of the frequencies generated for the first and the second frames are shown in FIGS. 3a, 3b and 3c of the accompanying drawings. Similar features in each of FIGS. 3a, 3b and 3c are denoted by the same reference numeral with the suffix "a" "b" or "c" respectively. Frequency is shown increasing along the y-axis, with time increasing along the x-axis. The transmitted signal includes four different frequency steps 310, 312, 314, 316 increasing in frequency in, typically, 250 kHz steps from a 77 GHz base.

In FIGS. 3a and 3b the first frame 300a/b generated comprises four steps 320a/b, 322a/b, 324a/b, 328a/b sequentially increasing through the four frequencies 310, 312, 314, 316. The sequence of frequencies in the second frame 301a/b differs between the two examples.

In the scheme of FIG. 3a of the accompanying drawings, the first two steps 330a, 332a of the second frame 301a are reversed compared to the first frame 300a such that they are reversed in frequency to have frequencies 312 and 310 respectively. If distance measurements are obtained using information from steps F3 and F4 in both the first and second frames there will still be ambiguities. However, if similar measurements are made using information in steps F1 and F2 it is possible to tell if the distance to the target is close to the radar or in the ambiguity range A2. For a close target the results from the first and second frames will match—for region A2 the results will be of opposite sign.

In the alternative shown in FIG. 3b of the accompanying drawings, the second step 332b of the second frame 301b is a continuation at the same frequency 310 of the first step 330b. Accordingly, frequency 310 is transmitted for double the period it is in the first step 300b whilst frequency 312 is omitted entirely. This leaves three steps F1, F2 and F3 for the measurement of distance compared to only steps F3 and F4 in FIG. 3a. It is, however, to be noted that the average transmission frequency of the first and second frames is different.

A still further alternative is shown in FIG. 3c of the accompanying drawings. In this example an extra step F0 has been added to both the first and second frames, the frequency of this step being modulated at exactly half the frame repetition rate such that the frequency of the step is different between the first and the second frames. This means that all of the four steps F1 to F4 can be used for distance measurement in both the first and the second frames.

In all three cases, the frames 300a/b/c, 301a/b/c, 302a/b/c are generated repeatedly in an alternating manner by the oscillator under the control of the waveform generator.

The signal generated by the oscillator 2 is transmitted by passing the output of the oscillator to a circulator 3. Circulator 3 has three ports 3a, 3b, 3c. Signals passed to each of the ports are passed on to the next port in the sequence 3a, 3b, 3c, 3a. Accordingly, the output of the oscillator 2 is received at port 3a of the circulator 3 and transmitted at port 3b. Port 3b is connected to an antenna 4. This antenna 4 transmits the output of port 3b of the circulator 3, and may receive echoes of the transmitted signal.

The received signal is passed back to port 3b of the circulator, which transmits the signal onto port 3c. The received signal is then mixed with the transmitted signal in a mixer 5. The mixed signal will have components at the frequencies of the sum of and the difference between the transmitted and received signals. The mixed signal is accordingly low pass filtered to contain only the difference signal and amplified by a filter-amplifier 6.

The filtered signal output from the filter-amplifier 6 is digitised by an analogue-to-digital converter (ADC) 7. This is then demultiplexed by a de-multiplexer 8 that samples and outputs the digitised signals at times corresponding to the end of each step 320a/b/c, 322a/b/c et cetera for one frame 300a/b/c or 301a/b/c and outputs these on four channels 101, 102, 103, 104. The de-multiplexer 8 then extrapolates the signals on each channel to allow for the time differences in taking each sample. A differencing means 9 takes the difference between each of the channels giving three difference values 105, 106, 107. Each differential phase shift is Fast Fourier Transformed (FFT) by an FFT unit 10. Accordingly, the FFT unit 10 outputs three signals 115, 116, 117 indicative of the frequency and phase of the differences between each channel 101, 102, 103, 104. Each channel in turn is indicative of the difference in phase and frequency of the transmitted and received signals.

If a transmitted signal is reflected off a target and received within the time in which it is being transmitted (i.e. in the same frequency step as the signal which caused it) each channel 101, 102, 103, 104 will be a constant. This constant describes the phase shift between the transmitted and received echo signals. The difference between these phase shifts for steps of different frequencies is, as described above, dependent on the range of the target. This means that the range of the target can be calculated 110 by a distance estimator 11 from the formula:

$$D = \frac{c\Delta\phi}{4\pi\Delta f}$$

where D is the distance to the object from which the echo is received, c is the speed of light, $\Delta\phi$ is the differential phase shift and $\Delta f$ the difference in frequencies between the relevant steps. Each differential phase shift 115, 116, 117 should give (approximately) the same result.

However, as the target moves further away from the antenna, the amount of overlap between the period in which each frequency step is transmitted and the corresponding echo of the same frequency can be received decreases, until there is no overlap. This then causes the mixer to mix two different frequencies when calculating the phases, resulting in a signal that varies at the difference in frequencies in adjacent steps. It can be seen in the FFT signals for such a situation that the differences between all four channels 101, 102, 103, 104 will be modulated. The distance estimator 11 will calculate a different distance from each of the FFT signals 115, 116, 117 and may also flag from the FFT signals that the frequency of the difference signals are all non-zero and the so the target is in a first ambiguity range greater than a first distance away.

If the first frame 300a/b/c were to be continually transmitted, there would come a point as the target moved still further away from the radar system where the corresponding steps of one frame would be received at the same time as the corresponding steps in the next frame were being transmitted. This would mean that the channels 101, 102, 103, 104 would become unmodulated once more and the calculated values of D would agree. However, the calculated values of D would give an erroneous apparent distance very close to the radar system. Using the typical frequencies described above, this could lead to a large target at 1.5 km distance appearing to be a small target at virtually zero distance.

Because alternating first and-second frames are transmitted, the ambiguity can be eliminated. Regardless of which of the waveforms of FIGS. 3a, b or c are used, the results of some of the phase comparisons from steps F0 to F4 will differ from the first frame to the second frame when then target is in ambiguity range A2 in FIG. 2, yet be the same for a close target.

To detect this 108, the apparatus includes a comparator 12 which checks that, if the phase differences are apparently constant, that they are constant for all of the pairs of steps in a frame. The use of a different sequence of frequencies fro the second frame 301a/b/c compared to the first frame 300a/b/c means that, should the steps of the first frame 300a/b/c be received at the same time as the second frame 301a/b/c is being transmitted (or vice versa), that it is not possible for all of the phase differences to be constant. The validator comparator 12 checks this, and should they not be, raises a further flag indicating the target is in a second ambiguity range.

It is appreciated that the signals of a first frame 300a/b/c could be received whilst the next first frame 300a/b/c is being transmitted, and this would lead to the same ambiguities as described above. However, given that this now occurs at a distance of 3 km in the above-described embodiment, it is unlikely that the extra 12 dB loss due to the extra distance would lead to any ambiguity.

Another important feature of the described embodiments is that whilst it is possible to tell that a target is in ambiguity range A2 because some of the phase comparisons between the first and second frames will not match, it is still possible to provide a distance value for a target in this range because at least two of the frequencies sent in the first frame are also sent in the second frame and will produce a match. For example, considering FIG. 3a measurements of signal phase can be made in periods F3 and F4 and the distance to the target calculated in the usual way. These measurements are unaffected by the reversal of steps F1 and F2 and so give the same result for both frames. A similar calculation is made for steps F1 and F2. For close targets the measurements made in odd periods will agree with the distance determined from F3/F4 whilst those made during even periods will be of opposite sign. For distant targets in the ambiguity range this will be reversed.

Figure 5:
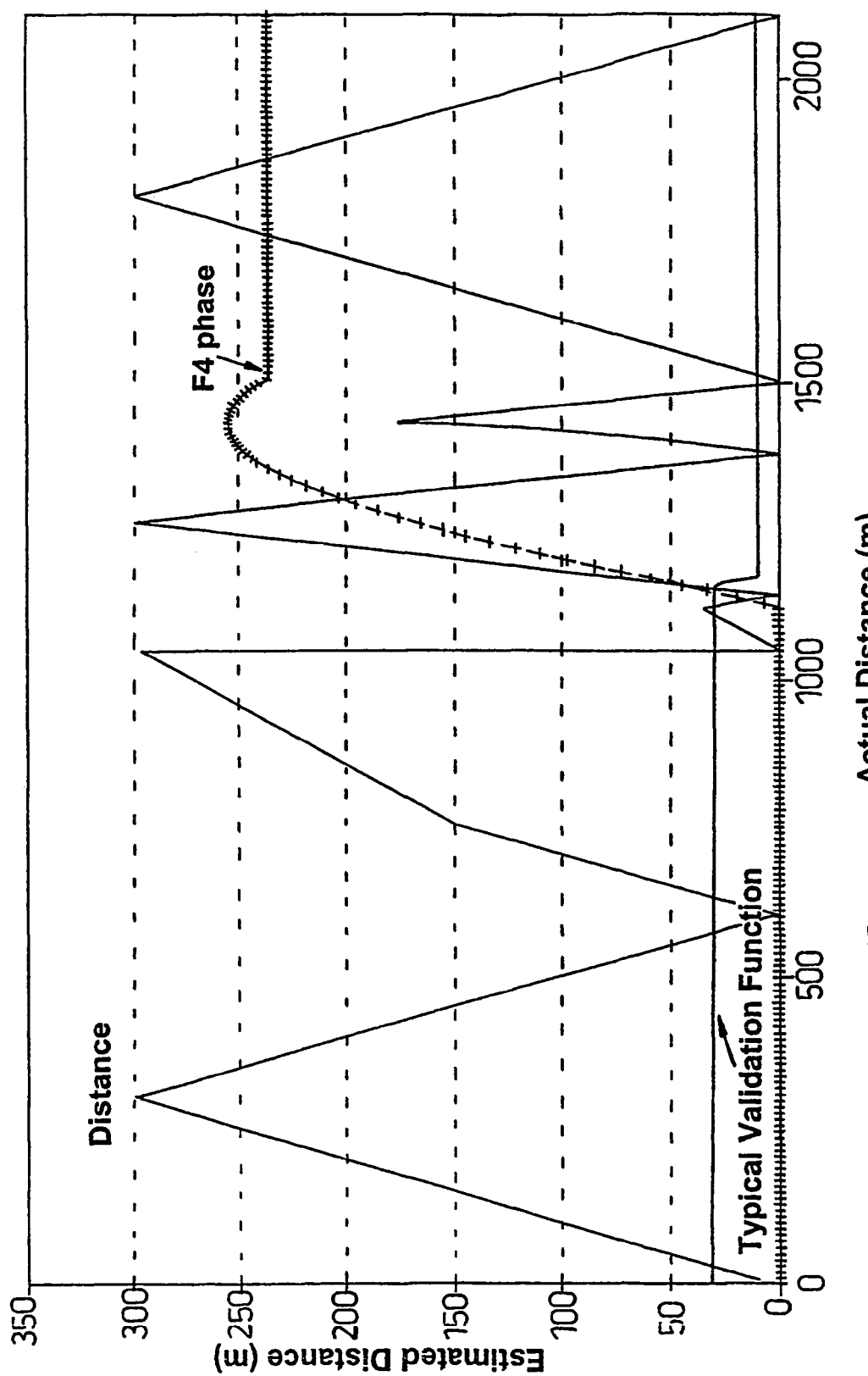
FIG. 5 is an example of the detection of a target distance from the invention.

If the waveform of FIG. 3(b) is used instead, measurements of phase can be made in steps F2 to F4 in the usual way and distances calculated. However, since there is different average frequency in odd and even frames these signals will be phase modulated for distant targets. By comparing the phase of signals measured in corresponding steps on odd and even frames it is possible to determine if the target is close or distant. Since the degree of phase modulation will depend on the signal delay and thus the target distance this signal will change progressively and will need to be compared with a threshold value to determine if the target should be accepted or ignored. Also since measurements made in different frequency steps are delayed relative to the modulated step (for example F1 in FIG. 3b) the point in the frame at which phase modulation occurs will vary. FIG. 5 shows the degree of phase modulation seen in frequency channel F4 and a typical validation function derived by comparing this with a fixed threshold. Of course, in practice the threshold could be made variable and in particular could be set at a proportion of the received signal amplitude for each corresponding target.

In addition or as an alternative to comparing the phase of pairs of frequency transmit/echo signals to remove the ambiguity it is proposed that in at least one embodiment the Doppler signals built up over a number of frames to determine the velocity of a target can be employed to remove the ambiguity in some cases.

To determine the Doppler frequency for a target the average phase of each transmitted frame is compared with the average phase of the echo signal. This is performed by taking a sample of each transmitted frame and of the return echo. For each echo that is returned from a close object, the only frequency difference that will exist between the transmit and receive signals will be that due to Doppler shift.

Figure 6:
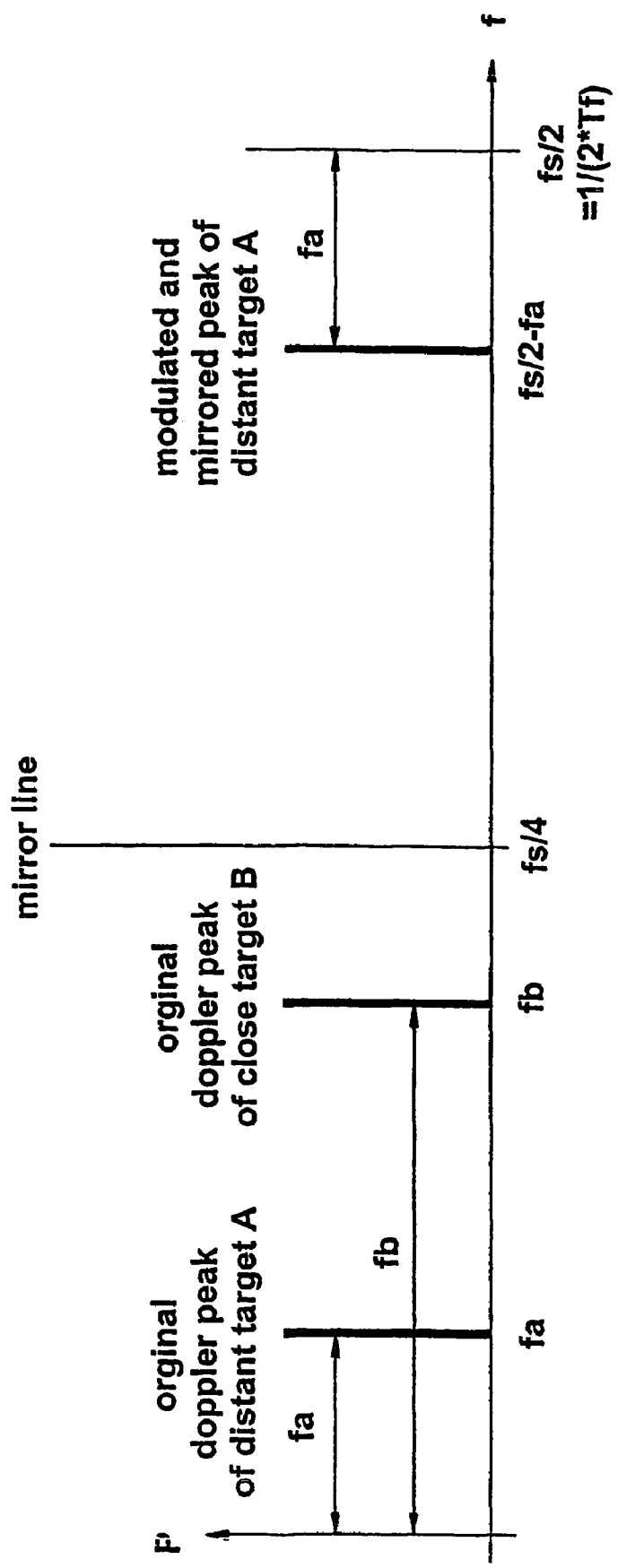
FIG. 6 shows the Doppler frequency spectra that are produced for a possible situation with an ambiguous and a non-ambiguous target.

Consider FIG. 6 which shows the frequency spectrum produced by taking samples in step F1 of FIG. 3c. It is to be noted that this step has been chosen because it is a "modulated" step, i.e. different frequency from odd and even frames. There are two targets A and B which are at different velocities. Also, higher speed target B is closer to the radar apparatus than target A which is slower. An echo from target B has a time of flight that is less than the duration of a step of frequency. As such, measurements of phase in step F1, or in step F" or F3 or F4 in each frame can be built up in the usual way to form a single Doppler peak as shown in FIG. 6.

Target A produces an echo which has a time of flight that is greater than one frequency step and this results in the generation of two Doppler peaks as shown in FIG. 6. If the Doppler signal is considered to have a frequency fa then the additional peak is mirrored at fs/4 and appears at fs/2-fa in the frequency spectrum where Fs is the frame frequency which is given by ½Tf where Tf is the duration of a frame.

By detecting the presence of more than one apparent Doppler peak it is possible to tell whether a target is nearby or at a great distance.

In accordance with the provisions of the patent statutes, the principle and mode of operation of this invention have been explained and illustrated in its preferred embodiments. However, it must be understood that this invention may be practiced otherwise than as specifically explained and illustrated without departing form its spirit or scope.

What is claimed is:

1. A range detection apparatus comprising:
   a transmitter adapted to transmit a microwave transmitted signal;
   a receiver arranged to receive an echo signal reflected from a target which corresponds to a portion of said transmitted signal;
   a signal generator adapted to generate a drive signal to be applied to said transmitter to produce said transmitted signal, said signal generator producing a drive signal which includes continuously alternating first and second signal frames with each signal frame including at least three frequencies, each first signal frame and each second signal frame having at least two frequencies in common but also differing from each other; and
   a processor adapted to process said echo signal together with said transmitted signal so as to determine a distance to said target that produced said echo signal.

2. A range detection apparatus according to claim 1 wherein said first signal frame and second signal frame comprise a burst of a signal at a first frequency followed by a burst of a signal at a second frequency that is different from said first frequency.

3. A range detection apparatus according to claim 1 wherein said drive signal generator includes a generator that generates a carrier waveform and a modulator that modulates said carrier waveform at half of a frame repetition rate to produce a drive signal that includes said first signal frame and said second signal frame.

4. A range detection apparatus according to claim 1 wherein each of the bursts of frequency within a frame has a frequency that differs from the frequency of the burst that is transmitted before it and also from the frequency of the burst which follows it within a frame.

5. A range detection apparatus according to claim 1 wherein said first signal frame comprises first, second and third frequencies A, B and C and said second signal frame includes said first Frequency A and said second frequency B but does not include said third frequency C.

6. A range detection apparatus according to claim 5 wherein said third frequency C is replaced in said second frame by one of a fourth, different, frequency D, a repeat of said first frequency A, and a repeat of said second frequency B.

7. A range detection apparatus comprising:
a transmitter adapted to transmit a microwave transmitted signal;
a receiver arranged to receive an echo signal reflected from a target which corresponds to a portion of said transmitted signal;
a signal generator adapted to generate a drive signal to be applied to said transmitter to produce said transmitted signal, said signal generator producing a drive signal which includes continuously alternating first and second signal frames with said first signal frame and said second signal frame including identical first, second and third frequencies with the order in which a first pair of said frequencies in said first signal frame are sent being different from the order in which said first pair of frequencies in said second signal frame are sent while the order in which a second pair of said three frequencies are sent in said first and second signal frames remains the same; and
a processor adapted to process said echo signal together with said transmitted signal so as to determine a distance to said target that produced said echo signal.

8. A range detection apparatus according to claim 1 wherein said processor includes a phase comparator adapted to compare a relative phase between a frequency of a portion of said echo signal and a frequency of a portion of said transmitted signal at the time of receiving said echo signal portion.

9. A range detection apparatus according to claim 8 further including an error signal generator which is adapted to raise an error flag when no meaningful phase difference can be determined from said comparison of said echo signal with said transmitted signal.

10. A range detection apparatus according to claim 8 which further includes a device that combines at least two phase differences determined by said phase comparator as a pair to determine a distance to said target that has produced said echo signal.

11. A range detection apparatus according to claim 10 wherein said comparator is a first comparator and further wherein a second comparator is provided which is adapted to compare a distance determined from a pair of echo/transmit frequency samples within said first signal frame with a distance determined from samples taken for a corresponding pair of frequencies within said second signal frame.

12. A range detection apparatus comprising:
a transmitter adapted to transmit a microwave transmitted signal;
a receiver arranged to receive an echo signal reflected from a target which corresponds to a portion of said transmitted signal;
a signal generator adapted to generate a drive signal to be applied to said transmitter to produce said transmitted signal, said signal generator producing a drive signal which includes continuously alternating first and second signal frames with each signal frame including at least three frequencies, each first signal frame and each second signal frame having at least two frequencies in common but also differing from each other; and
a processor adapted to process said echo signal together with said transmitted signal so as to determine a distance to said target that produced said echo signal, with said processor being adapted to compare an average frequency of a transmitted frame of said microwave transmitted signal with that of a frame of said echo signal to produce a Doppler signal over time which indicates a relative velocity of the apparatus and said target that produced said echo signal.

13. A range detection apparatus according to claim 12 wherein said processor is also adapted to detect the presence of more than one peak in said Doppler signal, and, in the event that a second peak is detected, to provide an indication that said target that produced said echo signal is a distant target or at a close range.

14. A method of removal of ambiguity in distance of a radar apparatus of the kind in which a carrier frequency is transmitted, the method comprising the steps of:
a) modulating the carrier frequency such that a sequence of first and second frames are transmitted with an initial transmittal of a first frame comprising a sequence of at least three different frequencies and a subsequent transmittal of a second frame comprising at least three different frequencies, the first and second frames having at least two frequencies in common but also differing from each other, the first and second frames being transmitted continuously and alternately;
b) receiving an echo signal corresponding to the transmitted signal which has been reflected from a target; and
c) processing the echo signal together with the transmitted signal to determine the distance to the target.

15. A range detection apparatus comprising:
a transmitter adapted to transmit a microwave signal;
a receiver adapted to receive an echo signal reflected from a target which corresponds to a portion of said transmitted signal;
a signal generator adapted to generate a drive signal to be applied to said transmitter to produce said transmitted signal, said signal generator producing a drive signal which includes a first signal frame comprising at least two frequencies and a second signal frame also comprising at least two frequencies, said second signal frame differing from said first signal frame, and
a processor adapted to process said echo signal together with said transmitted signal so as to determine distance to said target that produced said echo signal, said processor also adapted to compare an average frequency of a transmitted frame with an average frequency of a frame of said echo signal to produce a Doppler signal over time which indicates the relative velocity of the apparatus and said target that produces said echo signal, said processor further adapted to detect the presence of more than one peak in said Doppler signal and, in the event that a second peak is detected, to provide an indication that a target that produced the echo signal is a distant target or at a close range.

16. A range detection apparatus according to claim 15 wherein said first signal frame and second signal frame comprise a burst of a signal at a first frequency followed by a burst of a signal at a second frequency that is different from said first frequency.

17. A range detection apparatus according to claim 1 wherein said drive signal generator includes a generator that generates a carrier waveform and a modulator that modulates said carrier waveform at half of a frame repetition rate to produce a drive signal that includes said first signal frame and said second signal frame.

18. A range detection apparatus according to claim 17 wherein said carrier waveform is a simple sinewave.

19. A range detection apparatus according to claim 15 wherein each of said bursts of frequency within a frame has a frequency that differs from a frequency of the burst that is transmitted before it and also from the frequency of the burst that which follows it within a frame.

20. A range detection apparatus according to claim 15 wherein said first signal frame comprises first, second and third frequencies A, B and C and said second signal frame includes said first Frequency A and said second frequency B but does not include said third frequency C.

21. A range detection apparatus according to claim 20 wherein said third frequency C is replaced in said second frame by one of a fourth, different, frequency D, a repeat said first frequency A, and a repeat of said second frequency B.

22. A range detection apparatus according to claim 15 wherein said first signal frame and said second signal frame include identical first, second and third frequencies with the order in which a first pair of said frequencies are sent to said second signal frame being different from the order in which said first pair of frequencies are sent to said first signal frame and further wherein the order in which a second pair of said three frequencies are sent to said first and second signal frames remains the same.

23. A range detection apparatus according to claim 15 wherein said processor includes a phase comparator adapted to compare a relative phase between a frequency of a portion of said echo signal and a frequency of a portion of said transmitted signal at the time of receiving said echo signal portion.

24. A range detection apparatus according to claim 23 further including an error signal generator which is adapted to raise an error flag when no meaningful phase difference can be determined from a comparison of said echo signal with said transmitted signal.

25. A range detection apparatus according to claim 23 which further includes a device that combines at least two phase differences determined by said phase comparator as a pair to determine a distance to said target that has produced said echo signal.

26. A range determining apparatus according to claim 25 wherein a said comparator is a first comparator and further wherein a second comparator is provided which is adapted to compare a distance determined from a pair of echo/transmit frequency samples within said first signal frame with a distance determined from samples taken for a corresponding pair of frequencies within said second signal frame.

27. A range detection apparatus according to claim 3 wherein said carrier waveform is a simple sinewave.

* * * * *